(12) United States Patent
Godwin et al.

(10) Patent No.: US 7,047,029 B1
(45) Date of Patent: May 16, 2006

(54) ADAPTIVE TRANSMISSION SYSTEM

(75) Inventors: John P. Godwin, Los Angeles, CA (US); Patrick J. Loner, Hermosa Beach, CA (US); Jim C. Williams, Anaheim, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 810 days.

(21) Appl. No.: 09/950,511

(22) Filed: Sep. 10, 2001

(51) Int. Cl.
*H04B 15/00* (2006.01)
*H04B 7/01* (2006.01)

(52) U.S. Cl. .................... 455/505; 455/512

(58) Field of Classification Search .............. 455/3.01, 455/3.02, 8, 9, 10, 11.1, 12.1, 13.4, 427–430, 455/450, 452.1, 452.2, 501, 504–506, 522, 455/63.1–63.4, 67.13, 67.14; 342/352–355, 342/26 A–26 D, 26 R; 370/318; 725/63, 725/67, 68
See application file for complete search history.

(56) References Cited

U.S. PATENT DOCUMENTS

| | | | | |
|---|---|---|---|---|
| 4,004,224 A | * | 1/1977 | Arens et al. .................. 455/10 |
| 4,301,533 A | * | 11/1981 | Acampora et al. ........... 370/318 |
| 4,309,764 A | * | 1/1982 | Acampora .................... 370/318 |
| 4,567,485 A | * | 1/1986 | Oshima et al. .............. 342/358 |
| 4,776,035 A | * | 10/1988 | Duggan ........................ 455/69 |
| 4,837,580 A | * | 6/1989 | Frazita ........................ 342/374 |
| 4,837,786 A | | 6/1989 | Gurantz et al. |
| 4,888,596 A | * | 12/1989 | Conanan ..................... 343/703 |
| 4,896,369 A | * | 1/1990 | Adams et al. .............. 455/13.4 |
| 4,910,792 A | * | 3/1990 | Takahata et al. .............. 455/10 |
| 4,941,199 A | * | 7/1990 | Saam ........................... 455/10 |
| 5,060,292 A | * | 10/1991 | Ayukawa et al. ........... 455/505 |
| 5,081,713 A | * | 1/1992 | Miyazaki ...................... 455/76 |
| 5,204,970 A | * | 4/1993 | Stengel et al. ............... 455/69 |
| 5,257,029 A | * | 10/1993 | Miyo ......................... 342/352 |
| 5,867,109 A | | 2/1999 | Wiedeman |
| 5,878,329 A | * | 3/1999 | Mallinckrodt ............... 455/69 |
| 5,956,619 A | * | 9/1999 | Gallagher et al. ......... 455/12.1 |
| 6,085,067 A | * | 7/2000 | Gallagher et al. ......... 455/13.1 |
| 6,272,340 B1 | | 8/2001 | Wright et al. |
| 6,335,920 B1 | | 1/2002 | Strodtbeck et al. |
| 6,366,776 B1 | | 4/2002 | Wright et al. |
| 6,421,528 B1 | | 7/2002 | Rosen et al. |
| 6,430,394 B1 | | 8/2002 | Boyden |
| 6,466,569 B1 | | 10/2002 | Wright et al. |
| 6,512,749 B1 | | 1/2003 | Wright et al. |
| 6,519,446 B1 | * | 2/2003 | Tawil et al. ............... 455/3.02 |

(Continued)

*Primary Examiner*—Fan Tsang
*Assistant Examiner*—Joseph T Phan
(74) *Attorney, Agent, or Firm*—Georgann S. Grunebach

(57) ABSTRACT

A method, apparatus, article of manufacture, and a computer memory structure adaptively controlling a transmission signal from a satellite to at least one terrestrial receiver in a terrestrial region is disclosed. The method comprises the steps of receiving information describing a deleterious time-varying propagation characteristic of the transmission signal to the terrestrial region; generating the transmission signal having a transmission characteristic which mitigates the undesirable aspects of the time-varying propagation characteristic; and transmitting the generated transmission signal from the satellite to the terrestrial receiver. The article of manufacture comprises a controller device tangibly embodying instructions to perform the method steps described above. The apparatus comprises a receiver for receiving information describing a time-varying signal propagation characteristic of the signal to the terrestrial region; a signal generator for adaptively generating a transmission signal having a transmission characteristic mitigating the propagation characteristic; and a transmitter for transmitting the generated transmission signal.

22 Claims, 7 Drawing Sheets

U.S. PATENT DOCUMENTS

| | | | |
|---|---|---|---|
| 6,587,687 B1 * | 7/2003 | Wiedeman | 455/428 |
| 6,724,737 B1 | 4/2004 | Boyden et al. | |
| 6,745,043 B1 * | 6/2004 | Lester et al. | 455/512 |
| 6,813,476 B1 * | 11/2004 | Brooker | 455/10 |
| 6,813,485 B1 * | 11/2004 | Sorrells et al. | 455/313 |
| 6,834,180 B1 * | 12/2004 | Marshall | 455/67.11 |
| 6,836,650 B1 * | 12/2004 | Sorrells et al. | 455/319 |
| 6,842,437 B1 | 1/2005 | Heath | |
| 6,925,113 B1 | 8/2005 | Kim et al. | |
| 2002/0168974 A1 * | 11/2002 | Rosen et al. | 455/429 |
| 2003/0016634 A1 * | 1/2003 | Freedman et al. | 370/321 |
| 2003/0073435 A1 | 4/2003 | Thompson et al. | |

* cited by examiner

ADAPTIVE TRANSMISSION SYSTEM

BACKGROUND OF THE INVENTION

1. Field of the Invention

This invention relates to systems and methods for improving a power and bandwidth constrained transmission system, and in particular to a system and method for adaptively varying the transmission signal according to measured or predicted time-varying signal propagation characteristics.

2. Description of the Related Art

A typical communications system, whether terrestrial or satellite-based, is constrained in its transmission power and signal bandwidth. The communications system may also be required to deliver reliable communications to one point, as in a terrestrial microwave link, or to many points in a satellite broadcast system serving the United States.

A typical satellite communications system servicing a large geographical region such as the United States is typically designed such that all signals transmitted to terrestrially based receivers have a minimum carrier to noise ratio (CNR) when received anywhere in the service area or coverage region. The CNR of the signal at the receiver is a function of a number of parameters, including the power of the signal transmitted from the satellite and signal propagation characteristics such as atmospheric attenuation. Unfortunately, at the wavelengths typically used in satellite-to-home television broadcasts, rain and other sources of atmospheric attenuation have a significant effect upon the CNR. Hence, during heavy rain, some customers can experience degraded signal quality.

In the past, system designers have assured a minimum signal quality is provided by designing the satellite transmitters, power systems, and related components to produce sufficient power to assure a minimum CNR in all regions, even when compromised by unfavorable atmospheric attenuation characteristics. Unfortunately, the amount of attenuation from rain and similar atmospheric parameters can be substantial and widely varying. Hence, to achieve the desired CNR in all areas (including those with intense rain) this solution requires that the satellite transmitters, power system and related components be designed for high performance levels.

Increasing transmitter power on a communications satellite may be economically impractical or even technologically infeasible. Satellites have severe limitations on weight which can be delivered at desired orbital locations due to launch vehicle costs and other limitations. This weight limitation constrains the size of solar panels, the charge capabilities of the on-board batteries, and the physical size of the transmitter and related electronics. Furthermore, one type of transmitter, the traveling wave tube amplifier (TWT) has upper power limits for reliable operation.

What is needed is a system and method for adaptively controlling transmissions to receivers to account for time-varying atmospheric conditions. The present invention satisfies that need.

SUMMARY OF THE INVENTION

To address the requirements described above, the present invention discloses a method, apparatus, and article of manufacture for adaptively controlling a transmission signal from a satellite to at least one terrestrial receiver in a terrestrial region.

The method comprises the steps of receiving information describing a time-varying deleterious propagation characteristic of the transmission signal to the terrestrial region; generating the transmission signal having a transmission characteristic which mitigates the undesirable aspects of the time-varying propagation characteristic; and transmitting the generated transmission signal from the satellite to the terrestrial receiver. This improvement in the transmission signal(s) is achieved within the total power and bandwidth limitations of the transmission system. The article of manufacture comprises a controller or similar device tangibly embodying instructions to perform the method steps described above.

The apparatus comprises a receiver for receiving information describing a time-varying signal propagation characteristic of the signal to the terrestrial region; a signal generator for adaptively generating a transmission signal having a transmission characteristic according to the propagation characteristic; and a transmitter for transmitting the generated transmission signal from the satellite to the terrestrial receiver.

The present invention applies to a variety of terrestrial and satellite applications, but is especially advantageous in satellite distribution systems. Communications satellites are highly constrained in their DC and RF power capabilities, and also are typically required to deliver signals to widely distributed locations. The communications line-of-sight to each delivery point will have a unique time-varying propagation characteristic.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
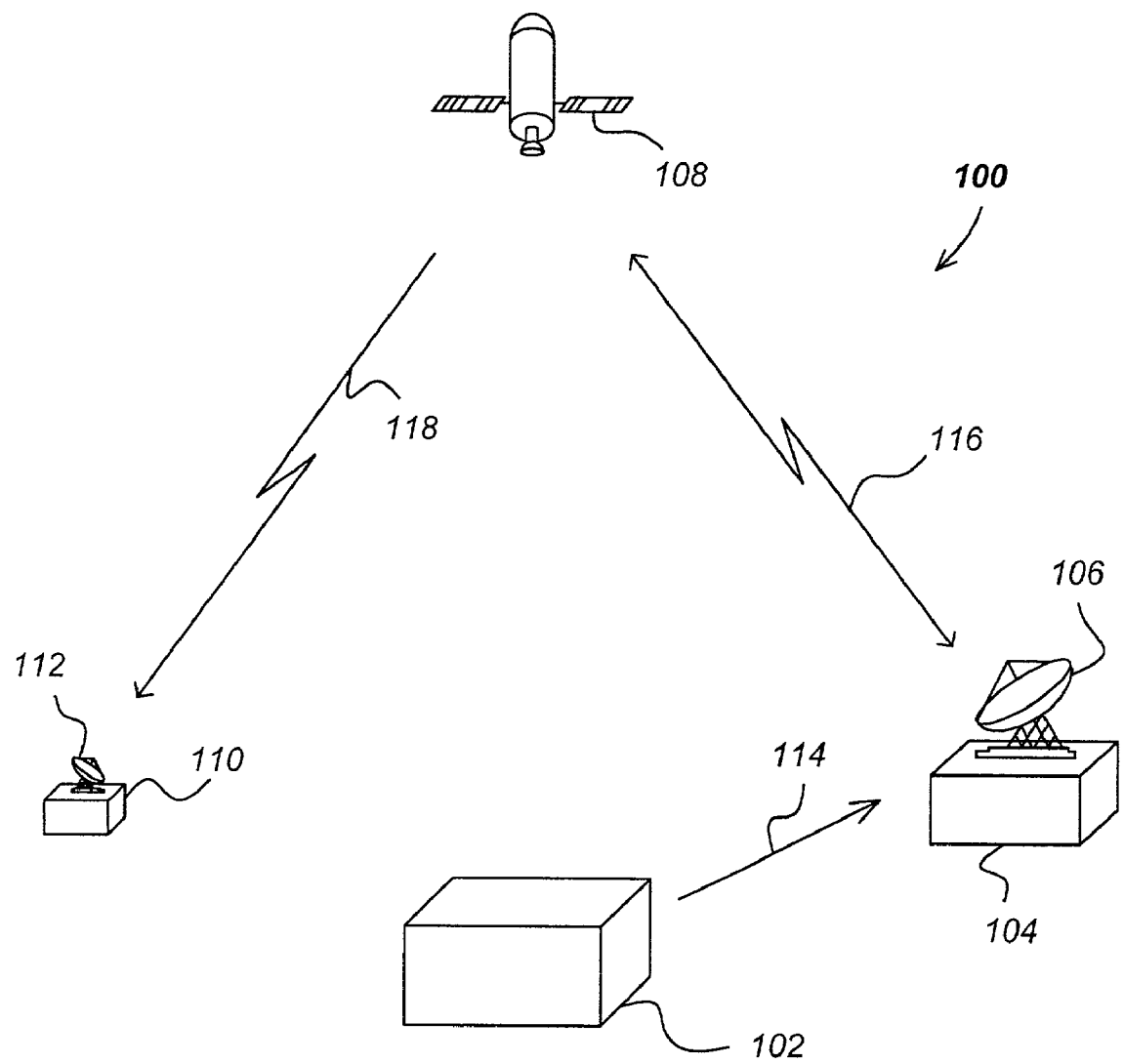
FIG. 1 is a block diagram illustrating an overview of a prior art video distribution system.

FIG. 1 is a diagram illustrating an overview of a multichannel video distribution system 100. The video distribution system 100 comprises an uplink center 104, a satellite 108, a terrestrial receiver 112 and a subscriber 110.

The uplink center 104 receives program material from external sources 102 via a communications link 114, and using an uplink antenna 106, transmits the program material and program control information to the satellite 108 via uplink 116. The satellite receives and transmits the video programs and control information to the subscriber via downlink transmission signal 118. The subscriber 110 receives this information using the terrestrial receiver 112. In one embodiment, the terrestrial receiver 112 includes an 18-inch offset-fed Ku-band antenna.

The video distribution system 100 can comprise a plurality of satellites 108 in order to provide wider terrestrial coverage, to provide additional channels, or to provide additional bandwidth per channel. In one embodiment of the invention, each satellite comprises 16 Ku band transponders to receive and transmit program material and other control data from the uplink center 104 and provide it to the subscribers 110. However, using data compression and multiplexing techniques the television channel capabilities are far greater. For example, two satellites 108 working together can receive and broadcast over 200 conventional (non-HDTV) television channels via 32 satellite transponders.

While the invention disclosed herein is described with reference to a satellite based digital video distribution system 100, the present invention may also be practiced with terrestrial-based transmission of program information, whether by broadcast, unicast, cable, the Internet, or other means. Further, the different functions collectively allocated among the control center 102 and the uplink center 104 as described above can be reallocated between these facilities as desired without departing from the intended scope of the present invention.

Although the foregoing has been described with respect to an embodiment in which the program material delivered to the subscriber is video (and audio) program material such as a movie, the foregoing method can be used to deliver program material comprising purely audio or purely data, or any combination of information as well.

Figure 2:
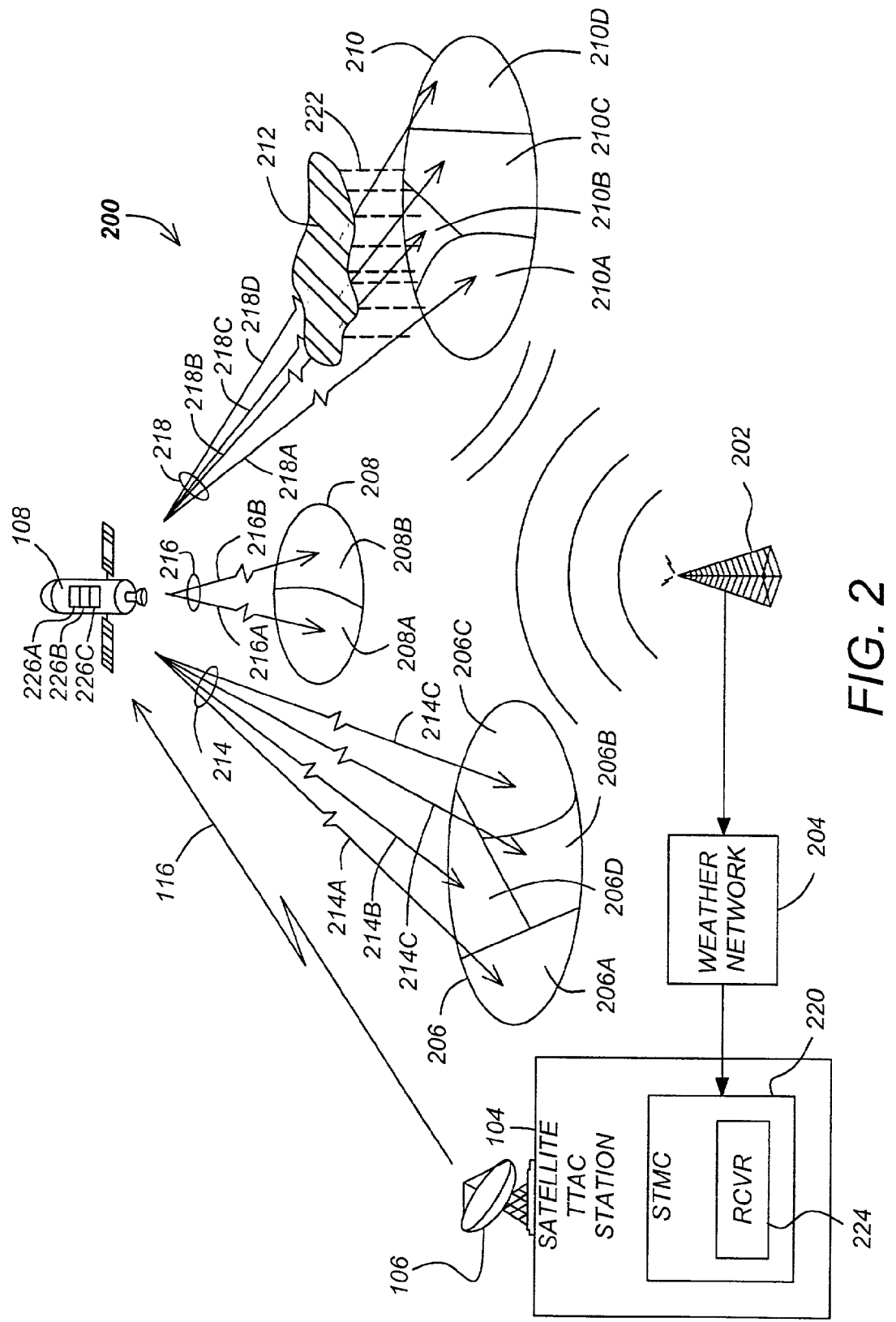
FIG. 2 is a diagram showing an overview of one embodiment of the video distribution system of the present invention.

FIG. 2 is a system block diagram of one embodiment of the video distribution network of the present invention. As described above, each satellite 108 in the video distribution system 100 comprises a plurality of transponders or transmitters 226A–226C (hereinafter referred to as transponder(s) or transmitter(s) 226) to receive and transmit program material and other data. In this embodiment, the satellite 108 transponders are configured such that a given transponder serves an associated region so as to permit selectable and controllable transmission of transmission signals to one or more terrestrial service regions 206, 208, and 210 within the continental United States (CONUS) or other geographical entity. While FIG. 2 illustrates a case with three service regions, the present invention can be used with any number of service regions, each served by some number of transmission signals.

In another, more elementary embodiment, all signals are delivered to all areas as in a television broadcast to all of the United States. In this embodiment, the satellite power distribution over CONUS is varied to mitigate the time-varying propagation characteristic to each point in CONUS. This power distribution variation can be created by electronically or mechanically varying the satellite transmitting antenna.

Sub-regions can also be defined within each terrestrial service region 206–210 can also be defined. As illustrated in FIG. 2, terrestrial region 206 includes sub-regions 206A–206D, terrestrial region 208 includes sub-regions 208A and 208B, and terrestrial region 210 includes sub-regions 210A–210D.

Sub-regions are areas within the terrestrial regions 210 in which programming transmitted to subscribers differ (i.e. local programming). In a conventional design, the regional beams are shaped, and the selected transmitter power levels selected, to give approximately uniform availability in each service area. The selected transmitters 226 are selected based on their maximum or saturated power levels and the number of different power levels is minimized to maintain equipment commonality in the satellite repeater. Each beam has one or more transmitters (transponders) 226 assigned which is proportional to the digital information destined to be transmitted to that region. Isolation between beams permits frequency reuse and, if satellite prime power is available, more communications capacity can be provided.

In one embodiment, the sub-regions are defined as designated marketing areas (DMAs), which can be defined according contractual arrangements or to comply with regulatory restraints regarding the retransmission of locally broadcast program material (regulatory constraints may prevent reception of satellite-transmitted programming in neighboring DMAs).

The transmission of signals from the satellite 108 to the subscriber antennae of the terrestrial receivers 112 within the terrestrial regions 206, 208, and 210 and the sub-regions 206A–206D, 208A–208B, and 210A–210D therein can be significantly affected by time-varying atmospheric disturbances 212 such as precipitation in the form of rainfall, sleet, and snow. Such atmospheric disturbances negatively affect the propagation characteristics of the downlink transmission signal 118 to the subscriber antennae, reducing the quality of the received transmission signal (as evidenced by a reduced CNR and hence a lower-quality presentation of the program material). Atmospheric disturbance secondary effects (such as increased subscriber antenna noise temperature) also contribute to reduced received signal quality.

The video distribution system 200 of the present invention adaptively controls generation and/or transmission of the downlink transmission signal 118 to the subscribers 110 in terrestrial regions 206–210 or sub-regions 206A–206D, 208A–208B, and 210A–210D to account for the above-described time-varying propagation characteristics. The downlink 118 quality is improved within the total power and bandwidth limitations of the satellite 108 used in the video distribution system 200.

Normally rain events cover only a small portion of the area served by a satellite system; for example, storms may be occurring along the Gulf Coast, but the remainder of CONUS may be quite clear. Also, the expanding weather network 204 (e.g. radar) gives, for the first time, near real-time nationwide information on where storms are in progress and where they are moving. This weather radar data gives rain intensity plots which directly correlate with rain attenuation at the microwave frequencies typically used in satellite communications.

In one embodiment, the information regarding the time-varying propagation characteristic is information regarding the precipitation in one or more of the terrestrial regions 206–210 and/or sub-regions 206A–206D, 208A–208B, and 210A–210D. This information can be obtained from the transmission signal itself, other internally derived sources (e.g. from transmitter information), or from sources independent from the transmission signal such as the Internet, the National Oceanic and Atmospheric Administration (NOAA), or similar sources. Ultimately, such precipitation information may be compiled in a weather information network 204 from radar measurements obtained from terrestrially based radar stations 202, from radar or infrared measurements from satellites, or from ground traditional ground measurements from terrestrially-based weather observation observations.

The precipitation information is provided to a satellite transmission management controller (STMC) 220 for processing. The information provided to the STMC 220 can include time-stamped samples (or "snapshots") of measured precipitation at specified intervals, or raw real-time data. The STMC 220 receives this information, and derives estimate of the propagation characteristic of the signal transmitted from the satellite 108 to the subscribers 110 in each particular terrestrial region 206–210 or sub-region 206A–206D, 208A–208B, and 210A–210D of interest. If desired, the estimate of the propagation characteristic can be predictive in nature (i.e. represent a prediction of the precipitation or propagation characteristic for a given terrestrial region 206–210 or sub-region 206A–206D, 208A–208B, and 210A–210D for one or more intervals of time). Alternatively or in combination with the foregoing, such predictions can be generated in the weather information network 204, or external to the video distribution system 200.

Using the estimate of the propagation characteristic of the signal transmitted from the satellite 108 to the subscribers 110 in each particular terrestrial region 206–210 or sub-region 206A–206D, 208A–208B, and 210A–210D of interest, the STMC 220 provides information to the satellite 108 regarding the desired transmission signal characteristics for each region or sub-region. Using this information, the satellite 108 is commanded to adjust the transponder(s) 226 servicing each terrestrial region 206–210 or sub-region 206A–206D, 208A–208B, and 210A–210D in order to obtain a desired service quality for the signal received at by each subscriber 110. For example, the satellite 108 in the video distribution system shown in FIG. 2 includes at least three transponders, wherein the first transponder transmits a first group 214 of signals 214A–214D to sub-regions 206A–206D, respectively; the second transponder transmits a second group 216 of signals 216A–216B to sub-regions 208A–208B, respectively; and the third transponder transmits a third group 218 of signals 218A–218D to sub-regions 210A–210D, respectively. Terrestrially based radar station 202 obtains data regarding the precipitation 222 from storm 212, which negatively impacts the propagation characteristic of transmission signals 218A–218D. The data includes, for example a measurement of the rain intensity in locations within the sub-regions of interest (210A–210D). The data is transmitted to a weather network 204 and to a receiver 224 in the STMC 220, where it is processed and used to control the transmission of signals from the satellite 108. In this case, since the precipitation 222 will reduce the signal quality in sub-regions 210A–210D, the transmission signals 218A–218D are adjusted accordingly. As described below, the signals can be adjusted to increase the average or instantaneous power of the signal carrier, the beamwidth of the transmission signal can be reduced (thus increasing the power of the signal in a portion of the coverage area), a higher, more robust level of forward error correction (FEC) can be selected and less information delivered, or any combination of these adjustments can be made.

Figure 3:
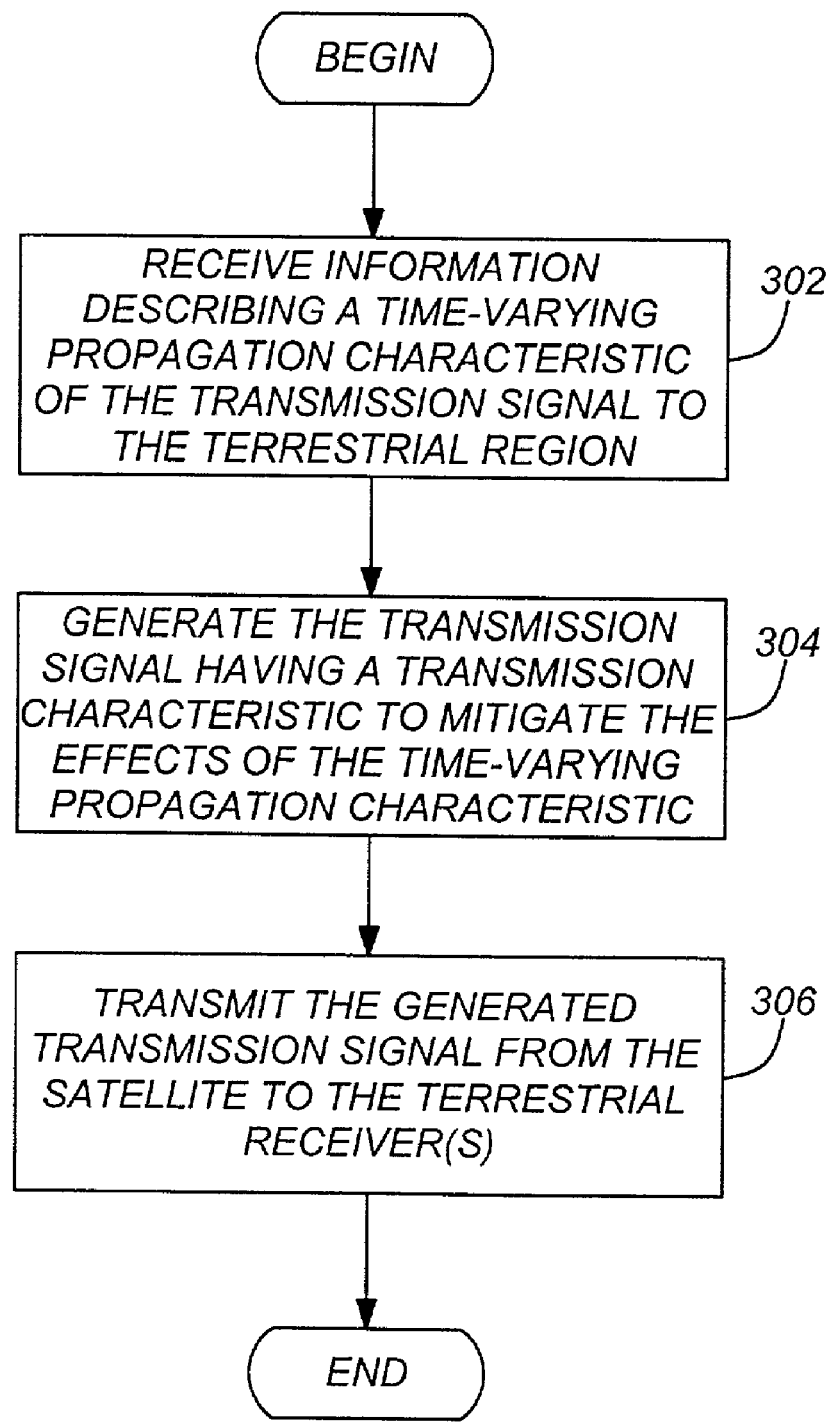
FIG. 3 is a flow chart showing illustrative method steps usable to practice one embodiment of the present invention.

FIG. 3 is a block diagram presenting an illustrative embodiment of method steps used to practice the invention. As shown in block 302, information describing a time-varying propagation characteristic of the transmission signal 118 from the satellite 108 to the terrestrial region or sub-region of interest is received. This information can include periodic or aperiodic measurement data, real-time measurement data, predicted information based on measurement data, or any combination of the above. The time-varying propagation characteristic may also include information regarding background noise, or any other time-varying information that is a significant factor in determining the quality of the signal received at the subscriber 110. As described above, the information can include information regarding the precipitation in the terrestrial regions or sub-regions of interest. Precipitation measurement data can be obtained from terrestrially based weather radar, satellite data, or other means.

As shown in block 304, a transmission signal having a transmission characteristic controlled in accordance with the received time-varying propagation characteristic is then generated. In an embodiment in which the controlled transmission characteristic is signal power, this is accomplished controlling the power of the transmitted signal according to the time-varying propagation characteristic. This may include, for example, the average power of a particular individual carrier or group of carriers and/or a particular signal component or group of components, the instantaneous power of the carrier(s) and/or signal component(s), or the average carrier power of one or more transponders on a terrestrial, airborne, or space-deployed communications repeater (such as satellite 108). In another embodiment of the invention, this is accomplished by controlling the beamwidth or power distribution across the coverage area of the transmitted signal from the satellite 108, thus increasing the effective power within a portion of the area covered by the transmitted signal beam. In another embodiment of the invention, this is accomplished by adjusting the carrier power for all signals serving a broad geographical region (e.g. regions 206, 208 or 210) by controlling the spatial power distribution characteristics of the transmit antenna on the satellite 108. In yet another embodiment of the present invention, the transmitted signal incorporates forward error correction (FEC), and the FEC applied to the transmitted signal is controlled according to the time-varying propagation characteristic. For example, in cases where the propagation characteristic indicates that a particular terrestrial region or sub-region will be subject to increased signal attenuation (for example, due to a localized rainstorm), the FEC bits applied to the error correction may be increased (with a reduction in the bandwidth of the information transfer) to assure that the most critical information is received at an acceptable quality level. Power levels, power distribution patterns, and FEC levels can also be selected in combination to achieve the desired combination of received signal quality and bandwidth. Several levels of FEC can be applied (e.g. turbo codes with 7/8, turbo codes with 4/5, convolutional codes with 6/7, and convolutional codes with 2/3 can be used).

As shown in block 306, the generated signal is then transmitted from the satellite 108 to the subscribers' terrestrial receivers.

Figure 4A:
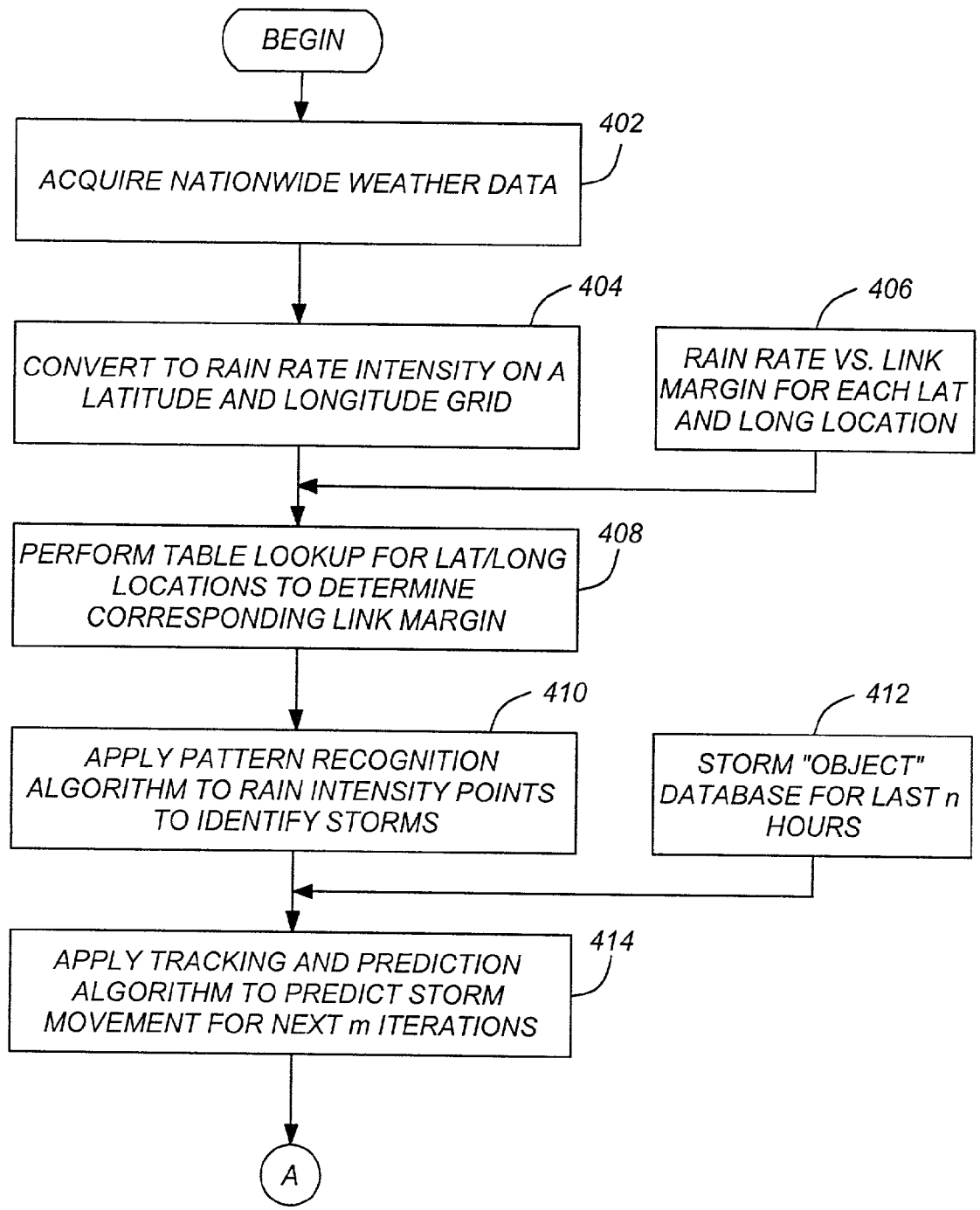
FIGS. 4A and 4B present a flow chart illustrating method steps usable to practice a further embodiment of the present invention.
Figure 4B:
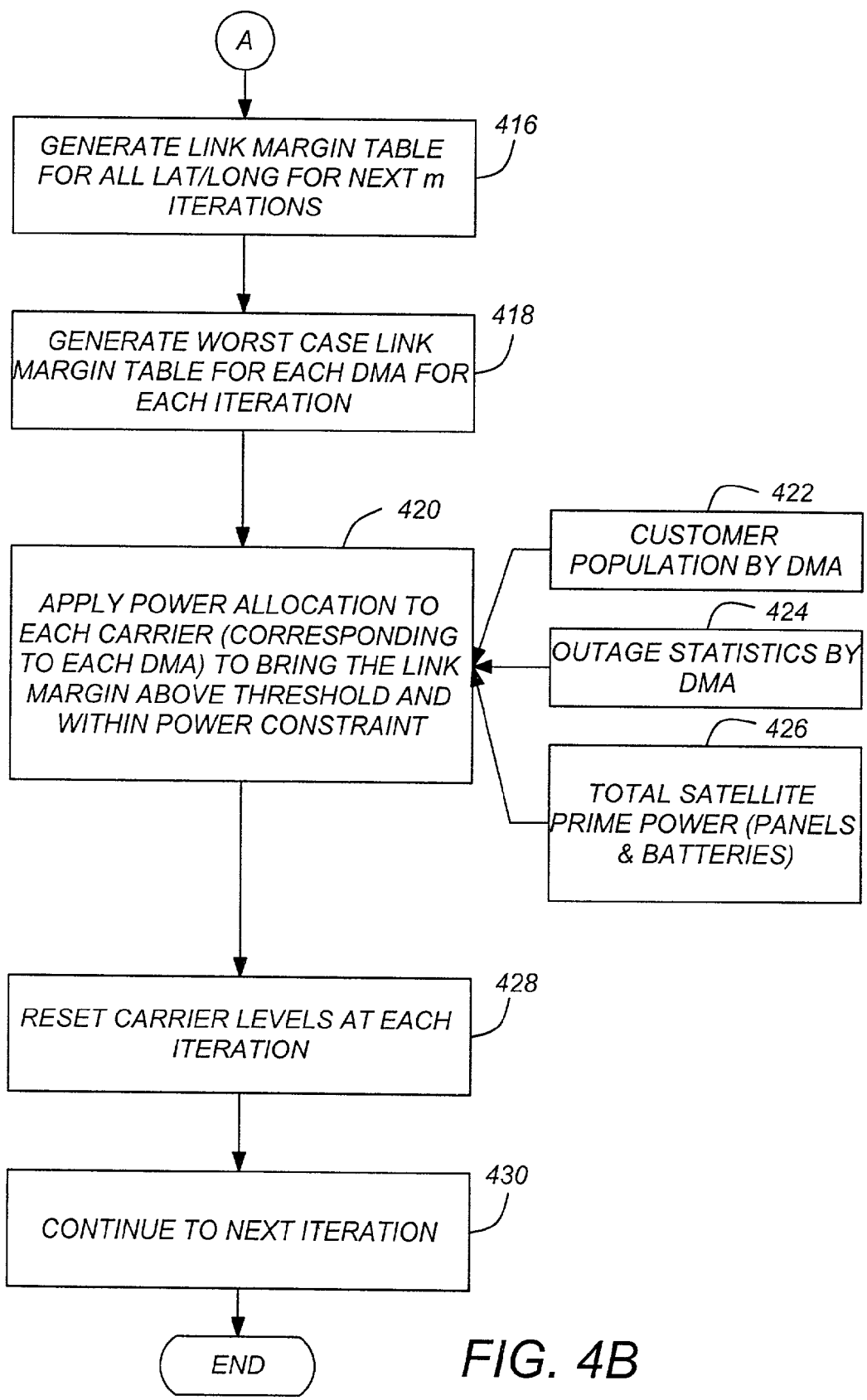

FIGS. 4A and 4B are flowcharts further presenting exemplary method steps used to practice the present invention. As shown in blocks 402 and 404, weather data is acquired and converted into a table or similar representation providing precipitation rate versus the latitude and longitude. In one embodiment, this information is obtained periodically and used to alter the transmission signal 118 as described below. In another embodiment, this information is examined to determine whether there are sufficient data changes to warrant a re-examination of transmission signal 118 power levels before such processing commences. The latency of the data obtained should be appropriately limited so that the information is useful in predicting signal propagation characteristics in the regions of interest. In one embodiment the precipitation data has a nominal data latency of about 15 minutes.

Next, using geographic/geometric data such as the given sub-region altitude above sea level and an atmospheric propagation model such as CRANE, an estimate is generated of the line-of-sight attenuation of the transmit signal between the satellite 108 and subscribers 110 in the sub-regions. Additionally, based on the signal attenuation, an estimate is made of the increase in sky temperature of the subscriber antennae.

Next, using the attenuation and sky temperature estimates, the corresponding link margin for particular locations of interest is determined, as shown in block 408. In one embodiment, this is performed by combining the rain rate or intensity information described above with a computed or pre-stored representation of the relationship between the rain rate and the link margin for each location, which is shown in block 406. The rain rate/link margin relationship can be described in a table, in a closed form expression equation, or can be determined by iterative computations.

The values for the link margin for each location can also be precomputed and stored in a table. Each location's level of rain intensity can then be categorized into a rain intensity step, and the associated rain fade estimate can be found by table lookup and interpolation. This embodiment is possible because the resolution of the estimate of the rain intensity typically requires only a few levels or steps, and the geometry for a given location's latitude and longitude is fixed (the satellites 108 are typically in geosynchronous or geostationary orbits).

Next, as shown in block 410, areas of high rain intensity (storms) are identified. This may be accomplished with the use of well-known pattern recognition algorithms, which identify "closed" regions from the link margin information as corresponding to storm activity. Tracking and prediction algorithms can be used to predict storm movement across regions and sub-regions as shown in block 414. To assist in this determination, a storm "object" database having storm information for the last n hours can be provided, as shown in block 412. Storm tracking information may include, for example, the speed and direction of the storm. Similar objects (i.e. objects with approximately the same propagation characteristics) may be grouped together into larger objects to simplify processing. Predictions of propagation characteristics for time intervals in the future may also be generated. In one embodiment, propagation characteristics are generated in one minute intervals for a total of fifteen minutes, and are stored as a grid of link margin values for each latitude and longitude location at each iteration for the next m iterations. This is illustrated in block 416.

Next, as shown in block 418, the worst case link margin is determined for each area of interest (region, sub-region, or DMA) and for each iteration. A transmission signal algorithm is then applied to determine the desired transmission signal change necessary to improve the link margin.

In one embodiment, the carrier power of the transmitted signal is adaptively modified to account for the time-varying propagation characteristics of the transmitted signal. In this embodiment, a power allocation algorithm is then applied to determine the desired power setting for each carrier used in the transmission signal, as shown in block 420. The power allocation algorithm may also determine the desired power setting based on auxiliary information such as information regarding the subscriber population and/or outage statistics by region, sub-region, or DMA, and/or the total available satellite signal transmission capacity (for example, in terms of total satellite prime power) as shown in blocks 422–426. The power information assures that the selected carrier power is within the maximum power capabilities of the satellite, and the customer and outage statistics assure that the available power is used to provide the best signal to the greatest number of subscribers. Power information may include not only instantaneous power availability, but predicted power availability due to time-varying effects such as that which occurs when the satellite 108 is in the Earth's shadow and the solar panels become ineffective. In another embodiment, the transmitted signal algorithm determines the transmit antenna gain distribution over CONUS, the region or sub-region, etc., or the type of FEC coding that is applied to each signal. Further, the transmitter power and/or beamwidth (or other transmitted signal characteristic) can also be controlled according to the auxiliary information alone. This can be accomplished by receiving information describing a time varying transmission signal requirement such as the subscriber population, transmission signal outage and/or satellite signal transmission capacity, and generating the transmission signal according to the time-varying transmission signal requirement.

Next, the desired transmitted signal characteristic (computed by the transmission signal algorithm) is applied to the transmitted signal, as shown in block 428. In one embodiment, the transmission signal algorithm is computed at a ground station and the signal changes are also applied at the ground station. For example, when the satellite 108 includes frequency-translation transponders, the transmission signal characteristic can be controlled by controlling the power of the signal transmitted from the uplink station to the satellite 108. Alternatively, the power level of the transmission signal can be controlled by transmitting commands from the uplink station to the satellite 108 to control the power amplifiers and/or attenuators internal to the satellite 108. In another embodiment, the necessary computations are performed at the ground station and signal changes are made on the ground and/or and in the satellite 108. Additionally, all computations and signal changes could be accomplished on board the satellite 108.

The foregoing information can be transmitted to the satellite 108 (or merely applied to the transmitted signal) on a periodic or aperiodic basis. In one embodiment, the desired characteristics of the transmission signal are computed every sixty seconds, and transmitted to the satellite at each iteration. In another embodiment, the desired transmission signal characteristics are computed at a given interval, but transmitted to the satellite 108 only if there is a sufficient change in the desired transmission characteristics from the previous value. Finally, the foregoing steps are repeated to determine the desired transmission signal characteristics for the next iteration, as shown in block 430.

Figure 5:
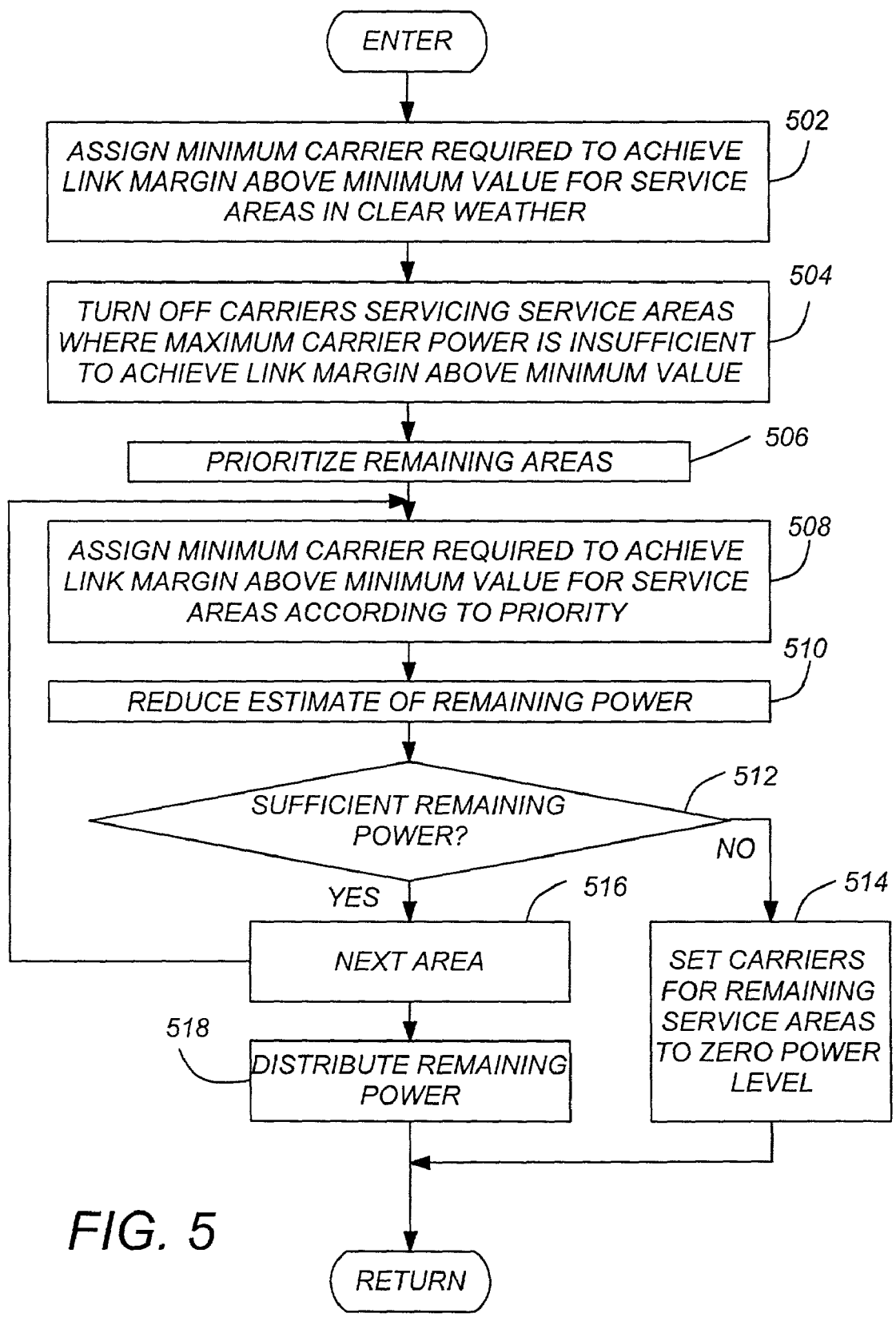
FIG. 5 presents a flow chart illustrating exemplary method steps used to allocate power to each transmission signal.

FIG. 5 is a flow chart illustrating one embodiment of method steps in block 420 used to compute the desired characteristics of the transmission signal. The minimum carrier power level required to achieve a link margin above what is required for a particular service quality is determined. This carrier power level is then assigned to service areas (including the regions, sub-regions, and DMAs) which are not experiencing signal propagation problems (i.e. those which are in clear weather), as depicted in block 502. Service areas experiencing signal propagation phenomena such that even the maximum carrier power is insufficient to provide a minimum signal quality (i.e. areas of severe storm activity) are also identified. Transmission signals and/or carriers to these areas are interrupted, turned off, or otherwise disabled, thus saving satellite 108 power for other service areas, as shown in block 504.

Next, the remaining service areas are prioritized, as shown in block 506. In one embodiment, this is accomplished by preparing a list of service areas (or the transmission signal carriers for the service area), in which the list of entries are ordered from the highest priority service areas to the lowest priority service areas. The service areas can be prioritized by subscriber population (with larger populations having a higher priority); by statistical availability over a preceding time interval (e.g. 1 year)(with service areas with lower statistical availability having a higher priority), service area subscriber population weighted by unavailability over a preceding time interval (with larger populations given a higher priority), by power demand (with those service areas requiring less power granted higher priority), or combination of the above. The desired priority scheme can be selected by the operator.

In one embodiment of the present invention, authorized customers within a given region, sub-region, or DMA are assumed to have a uniform geographic distribution. Further, the present invention may increase the transmission signal 118 power above the clear weather value when an estimate of the number of affected subscribers exceeds a specified value. The number of affected subscribers can be determined, for example, from the average density of customers in a particular region, sub-region or DMA and the size of the storm or other disturbance. Hence, with knowledge of the number of affected subscribers, the power management algorithm can be used to maximize the number of receivers (subscriber population) that are at or above a minimum link margin, given the system constraints on spacecraft power and link information rates.

Next, in accordance with the prioritization described in block 506, each of the remaining service areas (excluding those addressed in blocks 502 and 504) are assigned a transmission signal with a minimum carrier strength required to achieve the desired link margins. This is illustrated in block 508. In the embodiment where prioritization is expressed by ordering the service areas from high to low priority, and the foregoing assignment is performed by allocating a transmission signal with sufficient carrier strength to achieve the required link margin to the first area in the ordered list, and reducing 510 an estimate of the remaining power available for other areas. Then, a transmission signal with sufficient carrier strength to the second area on the ordered list, and the estimate of the remaining power available for other areas is again reduced.

The strength of the transmission signals selected above represent the minimum margin above a threshold to achieve a particular reception quality during a rain fade event. Typically, the minimum reception quality excludes "freeze-frame" effects and other similar artifacts.

A check is made to determine if sufficient power remains 512. If not, the carriers for the remaining service areas are set to zero. If there is sufficient remaining power, and there are additional service areas that must be allocated a transmission signal, processing returns to step 508. If all service areas have already received their allocated transmission signal power, processing proceeds to block 518, where the remaining power (unallocated) is distributed among the service areas. This can include an equal allocation among active service areas, or a weighted average according to the power already allocated to the area in step 508.

The foregoing process steps are periodically or aperiodically repeated so that the transmission signal 118 power is adjusted to account for the time-varying propagation characteristic of interest. In one embodiment, the power is adjusted every 60 seconds. In another embodiment, the power is adjusted aperiodically, or when the content of the storm information indicates that a power adjustment is required.

The transmission signals 118 can be adjusted by commanding output level adjustment attenuators on the satellite 108 itself, or by providing commands to uplink carrier adjustment equipment at each uplink site 104. In one embodiment, commands to reduce certain transmission signal 118 power levels are transmitted and acknowledged before commands are set to increase power on other carriers to assure that the total satellite prime power demand is not exceeded. The transmission signal power level adjustment can be continuous or in a finite number of steps. For example, the power level may be adjusted in nine 1.0 dB steps, or set to zero.

In one embodiment, a database comprising information regarding the DC power required for each output power setting for each transmitter may be maintained and used to compute a total DC power requirement. This database can be used in performing the steps illustrated in FIG. 5. A daily estimate of the DC power available can obtained from this database.

The foregoing can be implemented in the satellite 108, the uplink center 104, or any combination of both. In either case, the present invention can be implemented by a computer system.

Figure 6:
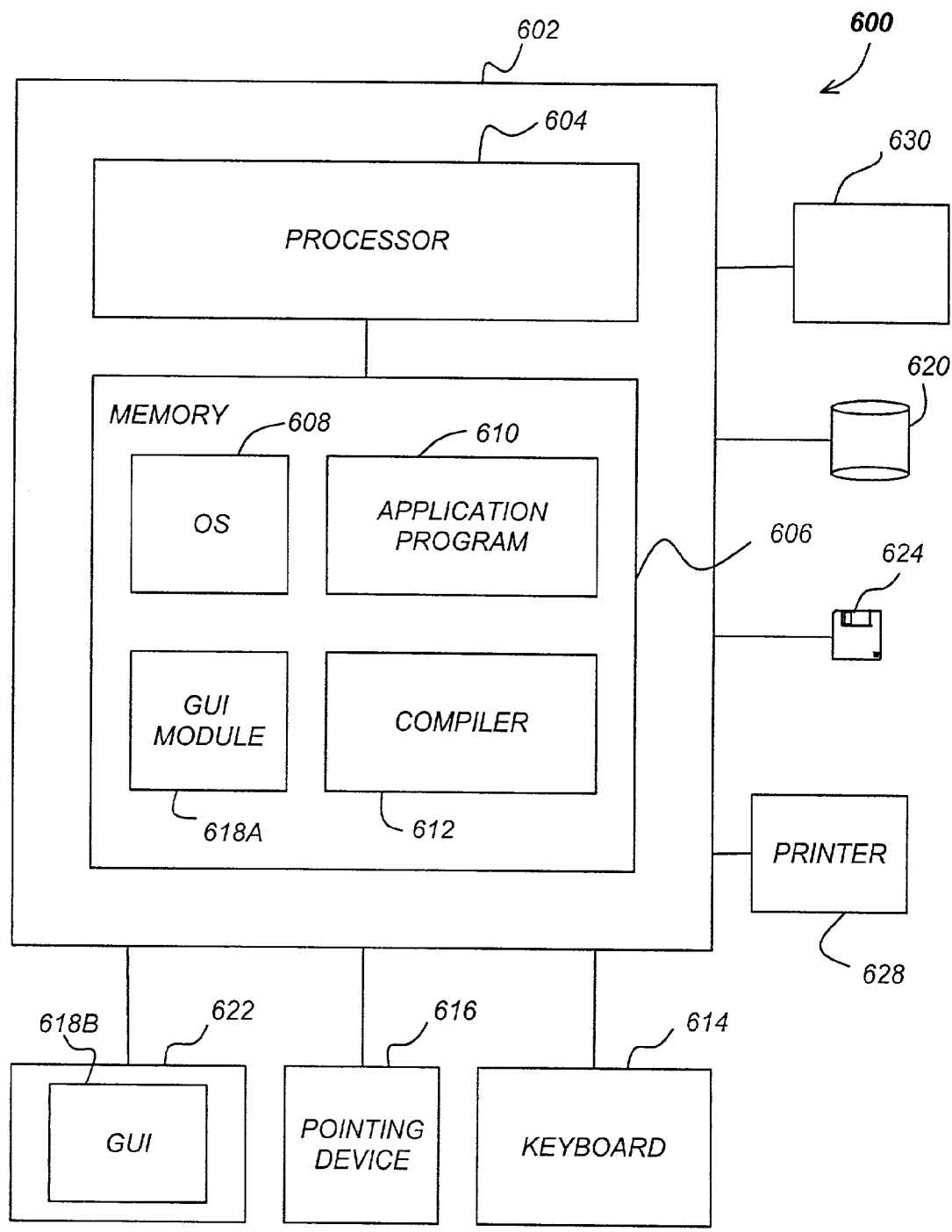
FIG. 6 is a diagram presenting an exemplary hardware environment usable in practicing the present invention.

FIG. 6 illustrates an exemplary computer system 600 that could be used to implement the present invention. The computer 602 comprises a processor 604 and a memory, such as random access memory (RAM) 606. The computer 602 may also be operatively coupled to a display 622, which presents images such as windows to the user on a graphical user interface 618B. The computer 602 may be coupled to other devices, such as a keyboard 614, a mouse device 616, a printer, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618A is depicted as a separate module, the instructions performing the GUI functions can be resident or distributed in the operating system 608, the computer program 610, or implemented with special purpose memory and processors. The computer 602 may also implement a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with the devices controlling the transmission signal.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the steps necessary to implement and/or use the present invention. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

ALTERNATIVE EMBODIMENTS

Different Service Classes: The present invention can also be practiced with a system having several classes of service each with a different quality of service (QoS). For example, although entertainment television or "real-time" data delivery often requires an annualized average link availability of 99.8%. Other data (e.g. data that is repetitively broadcast and whose latency is not temporally significant) may have reduced availability requirements (e.g. 99.5%). One example of such a service is the overnight delivery of an electronic newspaper. Since the subscriber is not reading the newspaper in real time, the data may be unavailable for short periods and still achieve the ultimate objective of delivering the data before a certain time. In such cases, the subscriber would be unaware that occasionally, due to rain, an extra transmit cycle is needed to properly store the complete newspaper.

Reduction of Transponder Power to Simplify Satellite Design: The satellites 108 used to transmit the signals described above typically obtain power from two sources: (1) solar panels, and (2) batteries. Battery power is normally used during periods where the Earth eclipses the sun and shades the satellite's 108 solar panels.

The total power availability is an important and limiting characteristic of communications satellite design. Typically, it is assumed that all communications transmitters on a communications satellite must operate continuously at their maximum rated level. Consequently, the prime solar panel power determines the maximum total available transmitting power of the transmission signal (typically determined by the carrier power).

The present invention allows some transmitters to be operated at lower power levels, especially in situations where it is known that all locations within the coverage region have excess link margin. Further, because additional prime power can be made available in cases when a number of transmitters are frequently operated at reduced power levels, the present invention permits the use of additional transmitters.

In other embodiments, power not required in a region may be used to charge batteries to store energy, which may then be used to supplement power obtained from solar panels when needed (e.g. when the total desired transmission power exceeds for short periods the available output of the solar panels).

In other embodiments, the present invention can also be used to simplify satellite 108 design. For example, a full complement of batteries would not be required where some carriers could be reduced or the carriers turned off during the eclipse periods when the batteries are normally utilized. The cost and weight of the batteries saved could be devoted to other purposes.

Real-time Changes in Error Control Coding: Typically, a digital transmission signal 118 is forward error control (FEC) coded. In some applications, the FEC scheme includes a single data stream in each satellite transponder having two modes: (1) a high information rate mode (of e.g. 30.3 Mbps) and a lower information rate mode (of e.g. 23.6 Mbps). The high information rate mode requires a link carrier to noise spectral density approximately 3 dB better than the low information rate mode of 23.6 Mbps. These two modes are achieved by changing the convolutional code rate in the transmitted stream. All decoders in the subscriber's integrated receiver/decoders (IRDs) are designed to follow these code changes automatically. This allows most links to be routinely operated at 30.3 Mbps and re-configured to 23.6 Mbps if a storm was expected in the coverage area. For example, the (highly available) 23.6 Mbps capacity could be used for television and real-time information, and the (lower availability) 30.3 Mbps signal with an additional 6.7 Mbps of throughput made available when possible for non-real time or "cached" services.

In one embodiment of the present invention, the transmitted signal 108 includes a first information portion characterizable by a first priority (for example, real-time data) and a second information portion characterizable by a second priority (for example, non-real time data). In this embodiment, using the measured or predicted time-varying propagation characteristic, information is selected from the first information portion and the second information portion according to the first and second priority and the time-varying propagation characteristic. For example, higher priority data only may be transmitted to service areas affected by storm activity.

The present invention can be used to implement any combination of the foregoing improvements. This can be accomplished by segregating service into different service classes and determining the minimum transmission signal characteristics that are required for each class of service. If the standard transponder maximum power is selected by the satellite designer, a certain number of satellite transponders can be shut off or operated at a reduced power level, thus placing less demands on the satellite 108 prime power and battery capacity, and allowing for a simpler power subsystem design or use of the reserve power by other satellite subsystems. During operation, transmission signal carriers are dedicated to different service classes, and the FEC mode is selected to provide the greatest throughput for the required error quality and availability. Conversely, if all carriers must carry the services requiring the best error quality then the FEC mode of all carriers may be changed to this mode prior to the appearance of storms anywhere in the region. During clear weather over the entire region all carriers will be operated in a mode which supplies additional throughput. This excess throughput during clear weather is used for non-real-time services or any services that can be preempted during storms.

Adaptive Modulation Schemes: To account for the time-varying propagation characteristic of the transmission signal, the present invention can also modify or select the modulation scheme (each of which permit a particular data rate under specified transmission conditions) used in transmission. For example, a phase shift keyed (PSK) modulation scheme may be utilized. PSK modulation schemes include signal constellations with a plurality of signal points arranged in a wide variety of constellations, including QPSK, 8-PSK, and 16-PSK. When such modulation schemes are used, the first modulation scheme can be, for example, a lower data rate modulation scheme such as QPSK, and the higher data rate modulation scheme can include 8, 16 or 32-PSK. Quadrature amplitude modulation (QAM) and variants thereof can also be used.

Combination of Transmission Characteristics: Variations in the foregoing transmission characteristics can also be used in a number of combinations. For example, a technique can be employed in which a 16-QAM modulation scheme is used during low rain conditions, a QPSK is used during high rain conditions, and which varying levels of FEC are applied as well. In this embodiment, the combined selection of the modulation and the FEC level(s) provide a greater number of channel coding alternatives.

Simultaneous transmission of high priority and lower priority data: The present invention can also be used to transmit high and lower priority data at the same time. In this embodiment, two or more levels of coding and/or modulation can be utilized in which the more robust coding carries the higher priority data, and the less robust coding carries the lower priority data. The coding and/or modulation can then be varied according to the real or predicted weather, thus optimizing data transmission, increasing the availability (and the predictability of the availability) of the applicable portions of the data transmission.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of adaptively controlling a transmission signal for transmission to at least one receiver in a terrestrial region, comprising the steps of:
   receiving information describing a time-varying propagation characteristic of the transmission signal in the terrestrial region;
   generating the transmission signal having a transmission characteristic according to the time-varying propagation characteristic, comprising the steps of accepting a first information portion characterizable by a first priority and a second information portion characterizable by a second priority and selecting information from the first information portion and the second information portion according to the first priority and the second priority and the time-varying propagation characteristic; and
   transmitting the generated transmission signal having the selected information to the receiver.

2. The method of claim 1, wherein the information describing the time-varying propagation characteristic is derived from information independent of the transmitted signal.

3. The method of claim 1, wherein the information describing the time-varying propagation characteristic is received from an information source independent of the transmitter.

4. The method of claim 1, further comprising the step of repeatedly receiving updated information describing the time-varying propagation characteristic and modifying the transmission signal in accordance with the updated information.

5. The method of claim 1, wherein the information describing a time-varying propagation characteristic of the transmission signal includes a predicted time-varying propagation characteristic.

6. The method of claim 1, wherein:
   the method further comprises the step of generating a predicted time-varying propagation characteristic from the received information describing the time-varying propagation characteristic; and
   the step of generating the transmission signal having a transmission characteristic according to the time-varying propagation characteristic comprises the step of generating the transmission signal according to the predicted time-varying propagation characteristic.

7. The method of claim 1, wherein the step of receiving information describing a time-varying propagation characteristic of the transmission signal to the terrestrial region comprises the step of receiving information regarding measured precipitation in the terrestrial region.

8. The method of claim 7, wherein the information regarding measured precipitation comprises rain intensity information.

9. The method of claim 8, wherein the rain intensity information is derived from radar measurements.

10. The method of claim 1, wherein the first information portion comprises real-time program information and the second information portion comprises non real-time program information, and the step of selecting information from the first information portion and the second information portion according to the first priority and the second priority and the time-varying propagation characteristic comprises the steps of:
    selecting teal-time information at a higher priority than the non-real time information.

11. An apparatus for transmitting an adaptively controlled signal to at least one receiver in a terrestrial region, comprising:
    a receiver for receiving information describing a time-varying propagation characteristic of the signal in the terrestrial region;
    a signal generator for adaptively generating a transmission signal having a transmission characteristic according to the propagation characteristic; and
    a transmitter for transmitting the generated transmission signal to the receiver;
    wherein the transmission signal includes a first information portion characterizable by a first priority and a second information portion characterizable by a second priority, and the signal generator includes a module for selecting information from the first information portion and the second information portion according to the first priority and the second priority and the time-varying propagation characteristic.

12. The apparatus of claim 11, wherein the information describing the time-varying propagation characteristic is derived from information independent of the transmitted signal.

13. The method of claim 11, wherein the information describing the time-varying propagation characteristic is received from an information source independent of the transmitter.

14. The apparatus of claim 11, wherein the information comprises a measured precipitation in the terrestrial region.

15. The apparatus of claim 14, wherein the measured precipitation comprises rain intensity information.

16. The apparatus of claim 15, wherein the rain intensity information is derived from radar measurements.

17. The apparatus of claim 11, wherein the signal generator module selects the real-time information at a higher priority than the non-real time information.

18. The apparatus of claim 11, wherein:
the signal generator is disposed at an uplink station; and
the transmitter comprises a frequency-translation communications repeater.

19. The apparatus of claim 11, wherein:
the signal generator is disposed in a communications repeater, and the signal generator comprises at least one power amplifier having a gain controllable via a command communications link from an uplink station.

20. The apparatus of claim 11, wherein:
the signal generator is disposed in a communications repeater, and the signal generator comprises at least one attenuator having an attenuation characteristic controllable via a command communications link from an uplink station.

21. An apparatus for adaptively controlling a transmission signal for transmission to at least one receiver in a terrestrial region, comprising:
means for receiving information describing a time-varying propagation characteristic of the transmission signal in the terrestrial region;
means for generating the transmission signal having a transmission characteristic according to the time-varying propagation characteristic, the means for generating comprising means for accepting a first information portion characterizable by a first priority and a second information portion characterizable by a second priority; and means for selecting information from the first information portion and the second information portion according to the first priority and the second priority and the time-varying propagation characteristic; and
means for transmitting the generated transmission signal having the selected information from the satellite to the terrestrial receiver.

22. A program storage device, readable by a computer, tangibly embodying at least one program of instructions executable by the computer to perform method steps of adaptively controlling a transmission signal for transmission to at least one receiver in a terrestrial region, the method steps comprising the steps of:
receiving information describing a time-varying propagation characteristic of the transmission signal in the terrestrial region;
generating the transmission signal having a transmission characteristic according to the time-varying propagation characteristic, comprising the steps of
accepting a first information portion characterizable by a first priority and a second information portion characterizable by a second priority, and
selecting information from the first information portion and the second information portion according to the first priority and the second priority and the time-varying propagation characteristic; and
transmitting the generated transmission signal having the selected information to the receiver.

* * * * *